Feb. 3, 1970         V. M. KRAMER                3,493,251
               CONNECTOR FOR FLEXIBLE HOSE
Filed July 16, 1968                          2 Sheets-Sheet 1
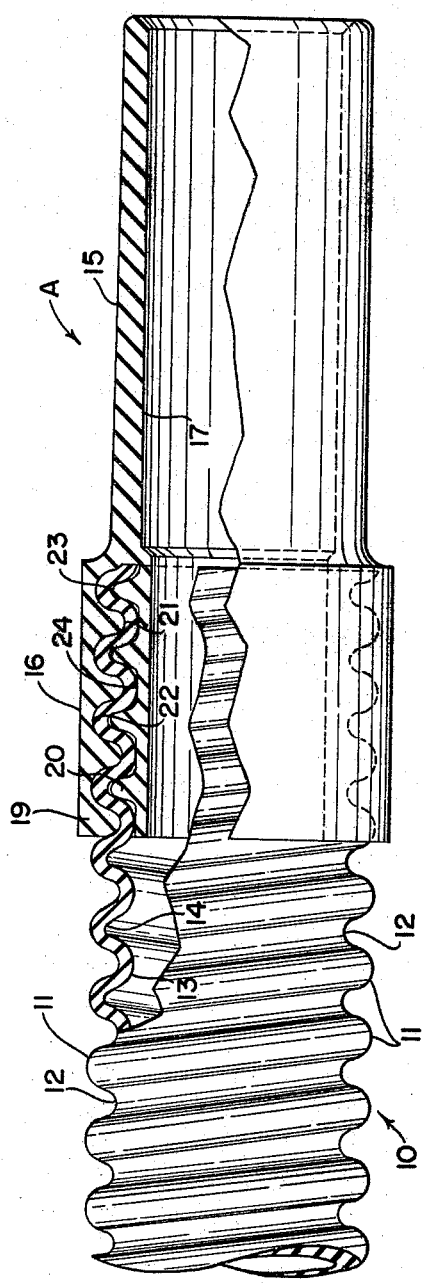
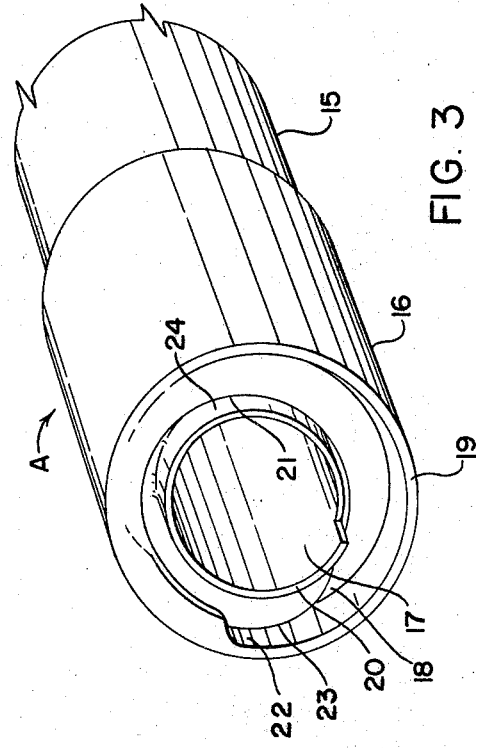
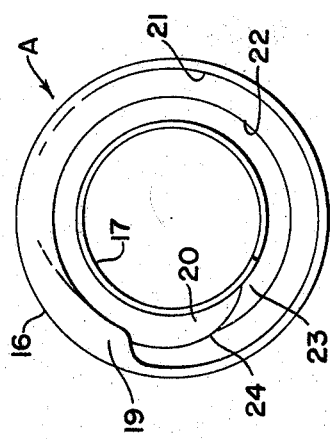
INVENTOR
VANCE M. KRAMER
BY *Bosworth, Sessions,*
*Herrstrom & Cain*
ATTORNEYS Feb. 3, 1970     V. M. KRAMER     3,493,251
CONNECTOR FOR FLEXIBLE HOSE
Filed July 16, 1968     2 Sheets-Sheet 2
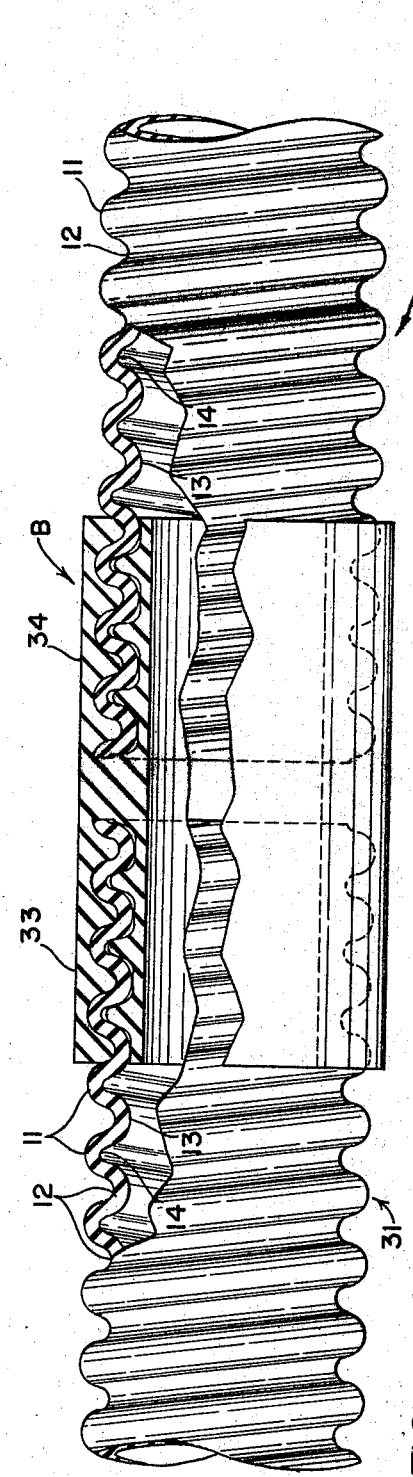
FIG. 5
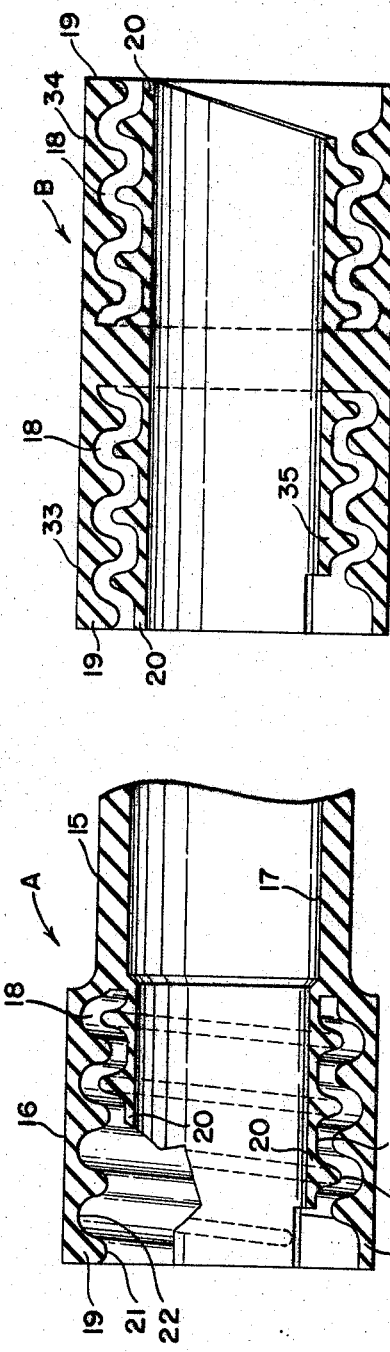
FIG. 6
FIG. 4
INVENTOR.
VANCE M. KRAMER
BY Bosworth, Sessions,
Herrstrom & Cain
ATTORNEYS United States Patent Office 3,493,251
Patented Feb. 3, 1970

3,493,251
CONNECTOR FOR FLEXIBLE HOSE
Vance M. Kramer, Perrysburg, Ohio, assignor to Crushproof Tubing Company, a corporation of Ohio
Filed July 16, 1968, Ser. No. 745,227
Int. Cl. F16l 31/00
U.S. Cl. 285—260        8 Claims

ABSTRACT OF THE DISCLOSURE

A terminal connector or coupler for tubular lengths of flexible hose formed of helical circumferential corrugations. The flexible device has an enclosed receptacle formed at either one end or both, the receptacle including an axially extending annular cavity of threaded or helical form adapted to match the helical corrugations of the hose. Forces tending to pull the hose end from the terminal connector or coupler increase the forces resisting separation to provide a locking connection.

BACKGROUND OF THE INVENTION

This invention relates to helically corrugated tubing, especially rubber tubing of the type disclosed in U.S. Patent No. 2,832,096. More particularly the invention relates to a terminal connector or coupling element for receiving in sealing relation a cut end of a length of such tubing.

As disclosed in U.S. Patent No. 2,879,953, helical corrugated rubber tubing may be made by first drawing an extruded tube of raw uncured rubber axially over an elongated mandrel formed with a continuous helical groove. The uncured rubber tube is forced into the groove by a length of cord wrapped around the tubing to impart the desired corrugated shape. The rubber is then cured in this condition and the cord removed. The mandrel is removed from within the resulting helical rubber tube by twisting it or in other words unthreading while the rubber tube is held against rotation.

The resulting corrugated helical tube is both flexible and strong and has particular application as hose for domestic and industrial vacuum cleaners, exhaust tubing, tubing for ventilation systems, as well as other similar applications. In the past such hoses were prepared in predetermined standard lengths and suitable molded terminal connectors were cemented to both ends. This practice however requires that the hose be manufactured in most cases only in standard lengths and adjustments in length to suit specific requirements cannot be made at the site of the installations. Also this type of terminal connector is difficult to manufacture and is expensive.

The present invention reduces the difficulties indicated above and affords other features and advantages not obtainable from the prior art which greatly enhance the utility of flexible tubing of the type described.

SUMMARY OF THE INVENTION

It is among the objects of the invention to eliminate integrally cemented terminal connectors at the ends of tubular lengths of flexible hose formed of helical corrugations.

Another object is to enable lengths of flexible hose with helical corrugations to be cut to exact size at an installation site and be quickly connected to the desired terminals at its ends.

Still another object is to enable two lengths of flexible hose with helical corrugations to be quickly connected to one another without chemical bonding, and to be quickly disconnected as desired.

These and other objects are accomplished by means of a coupling element that may be either a terminal connector or a line coupler adapted to be quickly attached to the end of a length of hose of the type described. The element comprises a tubular body having an enclosed receptacle formed at one end, the receptacle including an outer annular portion and an inner annular portion defining therebetween an annular cavity of helical form adapted to threadedly receive the end of a length of flexible helically corrugated hose.

The device may take either the form of a terminal connector wherein one end is adapted to be received in a vacuum cleaner hose end fitting or a socket of the equipment with which the hose is associated, or a coupler which serves to connect one cut end of a helically corrugated length of tubing to another such as for example where an unusually long length of hose is required.

Normally the length of the helical cavity is sufficient to accommodate at least three convolutions of the helically corrugated hose.

BRIEF DESCRIPTION OF THE DRAWINGS

FIGURE 1 is a side elevation of a terminal connector or hose end fitting embodying the invention with an end length of flexible helical hose connected thereto and with parts broken away and shown in section for the purpose of illustration;

FIGURE 2 is an end elevation of the terminal connector of FIGURE 1 with the hose removed;

FIGURE 3 is a fragmentary perspective view of the terminal connector of FIGURE 1;

FIGURE 4 is a fragmentary longitudinal sectional view of the terminal connector of FIGURE 1 with parts broken away for the purpose of illustration and with the hose end removed;

FIGURE 5 is a side elevation of a coupling element embodying the invention with parts broken away and shown in section for the purpose of illustration; and FIGURE 6 is a longitudinal sectional view of the coupling element of FIGURE 5 with the hose ends removed.

DESCRIPTION OF THE PREFERRED EMBODIMENTS

Referring more particularly to the drawings FIGURES 1–4 shows a terminal connector for connecting an end 10 of a length of flexible helically corrugated rubber tubing to a terminal point which may be for example the inlet of an industrial vacuum cleaner of the vacuum head. The flexible hose is formed of rubber in this instance and has an outer surface provided with a helical ridge 11 and an adjacent helical groove 12 so that the outer surface has in effect a single helical thread. The inner surface of the hose is provided with a helical ridge 13 and a helical groove 13, the ridge 11 registering with the groove 14 and the groove registering with the ridge 13 respectively so that the flexible hose has a generally uniform wall thickness throughout its length.

The terminal connector A has a fastening sleeve 15 at one end which may be secured in any number of ways to a socket or plug on the equipment with which the hose is associated. At the other end of the connector A is a receptacle 16 for the end length 10, the fastening sleeve 15 and receptacle 16 each having an axial passage 17 extending therethrough.

The receptacle 16 is provided with a generally annular cavity 18 defined by an outer sleeve 19 and a coaxial inner sleeve 20. The outer sleeve 19 has a helical ridge 21 formed therein and a helical groove 22, both ridge and groove having a single pitch and being adapted to mate with the groove 12 and ridge 11 respectively on the outer surface of the hose end length 10. The inner sleeve 20 is provided with a helical ridge 23 and a helical groove 24 of a single pitch adapted to mate with the groove 14 and ridge 13 respectively on the interior surface of the hose end length 10. Accordingly, the cavity 18 is of a generally helical form to provide a threaded enclosed annular socket matching the helical threaded configuration of the end length 10.

The end length 10 is connected to the terminal connector A by threading the receptacle 16 onto the end length 10 (turning the connector A in a clockwise direction as viewed from the right in FIGURE 1) or conversely by threading the end length 10 into the helical cavity 18 of the connector A (turning the hose clockwise as viewed from the left in FIGURE 1).

FIGURES 5 and 6 show another embodiment of the invention in the form of a coupler B for coupling one end length 31 of flexible, helically corrugated hose to another end length 32. It will be seen that the ends 33 and 34 of the coupler B are substantially identical to the receptacle portions 16 of the terminal connector A.

In each case, (i.e. the terminal connector A or the coupler B) the hose will be very firmly held in the cavity 18. In the case of the terminal connector A for example, when a pulling force is applied tending to remove the end of the hose from the cavity 18, the initial resisting force will act for the most part at the end of the receptacle 16. Thus the pulling force will tend to stretch or elongate the outer sleeve 19 and inner sleeve 20 and correspondingly will tend to elongate the cavity 18. The elongation of the cavity 18 tends to reduce its cross section and thus actually tends to reduce the size of the cavity. This results in a firmer gripping of the end length 10 to increase the frictional force tending to resist separation. Thus the greater the pulling force the greater the gripping force so that essentially a mechanical lock is provided.

The resistance to separation of the hose end length 10 and the terminal connector A (or coupler B) is further augmented by the interlocking effect of the helical ridges 21 and 23 of the members 19 and 20 respectively. Referring to FIGURE 4 it will be seen that the ridge 21 extends into the space between adjacent convolutions of the ridge 23 and vice versa. Thus the crest diameter of the external threads of the inner sleeve 20 is greater than the crest diameter of the internal threads of the outer sleeve 19. This provides a positive mechanical interference to resist separation of the hose end length 10 from the cavity 18.

The terminal connector A and coupler B are preferably of molded construction, the cavity 18 being formed by a core element which is unthreaded from the cavity 18 after curing. In order to facilitate threading of the flexible hose into the receptacle it is desirable that the cavity have a smooth surface and that the rubber or other material being used be relatively hard. Also it is desirable that the hose have a high resistance to the softening effect of petroleum products especially where the hose is to be used in garages and service stations to vent automobile exhaust fumes.

Where the connector or coupler is to be formed of rubber a typical compound comprises a mixture of synthetic and natural rubbers such as a conventional strip stock compound batched according to the following formulation:

| Ingredient: | Parts by weight |
|---|---|
| Natural rubber | 50 |
| SBR | 70 |
| Antioxidant | 1.25 |
| Stearic acid | 2 |
| Zinc oxide | 5 |
| Carbon black | 32.5 |
| Clay filler | 25 |
| Resin | 10 |
| Accelerators | 1.75 |
| Sulphur | 3 |

The rubber when cured should preferably have a Shore Hardness of about 70 on the durometer A scale and a tensile strength of about 1500 p.s.i. or better.

While the invention has been shown and described with reference to specific embodiments thereof, this is intended for the purpose of illustration rather than limitation and variations and modifications will become apparent to those skilled in the art in the intended spirit and scope of the invention as herein specifically illustrated and described. Therefore the patent is not to be limited in scope and effect to the preferred forms shown herein nor in any other way that is inconsistent to the extent to which the progress in the art has been advanced by the invention.

I claim:

1. A connecting device for receiving an end length of flexible elastomeric tubing formed of helical corrugations defining both internal and external threads, comprising an elastomeric tubular body having an enclosed receptacle formed at one end, said receptacle comprising an outer annular portion having internal threads and a coaxial inner annular portion having external threads, the crest diameter of said external threads being greater than the crest diameter of said internal threads, said portions defining therebetween an annular cavity of helical form generally complementary to the end length of flexible helically corrugated tube, whereby said end length may be threadedly received and enclosed within said receptacle.

2. A device as defined in claim 1 wherein said cavity has a single thread helical form.

3. A device as defined in claim 2 wherein said cavity comprises at least three convolutions of said helical thread.

4. A device as defined in claim 1 wherein the inner surface of said outer annular portion is provided with a first helical ridge with its convolutions separated by a first helical groove and wherein the outer surface of said inner annular portion is provided with a second helical ridge with its convolutions separated by a second helical groove, said second ridge extending between adjacent convolutions of said first ridge.

5. A device as defined in claim 1 wherein said connector is formed of hard rubber.

6. A device as defined in claim 5 wherein said rubber has a Shore hardness of at least 70 on the durometer A scale and a tensile strength of at least 1500 p.s.i.

7. A device as defined in claim 1 wherein said device is a coupler for connecting two end lengths of flexible tubing, said tubular body having a receptacle at each end.

8. A device as defined in claim 1 wherein said tubular body is of molded unitary construction.

References Cited

UNITED STATES PATENTS

| 454,648 | 6/1891 | Hallas | 285—251 |
| 3,017,654 | 1/1962 | Allenby et al. | 285—7 X |
| 3,078,109 | 2/1963 | Jackson et al. | 285—251 |
| 3,167,330 | 1/1965 | Draudt. | |
| 3,314,039 | 4/1967 | Opper | 285—7 X |

FOREIGN PATENTS

| 810,335 | 8/1951 | Germany. |
| 1,163 | 1878 | Great Britain. |
| 253,751 | 6/1926 | Great Britain. |

THOMAS F. CALLAGHAN, Primary Examiner

U.S. Cl. X.R.

285—331, 390, 398